(12) United States Patent
Wang et al.

(10) Patent No.: US 12,150,415 B2
(45) Date of Patent: Nov. 26, 2024

(54) BLOWER

(71) Applicant: TECHTRONIC CORDLESS GP, Anderson, SC (US)

(72) Inventors: Zhengjun Wang, Guangdong (CN); Jincheng Li, Guangdong (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 656 days.

(21) Appl. No.: 17/184,161

(22) Filed: Feb. 24, 2021

(65) Prior Publication Data

US 2021/0259167 A1   Aug. 26, 2021

(30) Foreign Application Priority Data

Feb. 26, 2020   (CN) .......................... 202020209922.4

(51) Int. Cl.

| | |
|---|---|
| *A01G 20/47* | (2018.01) |
| *F04D 25/06* | (2006.01) |
| *F04D 25/08* | (2006.01) |
| *F04D 29/26* | (2006.01) |
| *F04D 29/54* | (2006.01) |
| *F04D 29/70* | (2006.01) |

(Continued)

(52) U.S. Cl.
CPC .......... *A01G 20/47* (2018.02); *F04D 25/0673* (2013.01); *F04D 25/08* (2013.01); *F04D 25/082* (2013.01); *F04D 29/263* (2013.01); *F04D 29/547* (2013.01); *F04D 29/703* (2013.01); *F04D 19/002* (2013.01); *F04D 29/5806* (2013.01); *F04D 29/667* (2013.01)

(58) Field of Classification Search
CPC ... A01G 20/47; F04D 19/002; F04D 25/0673; F04D 25/082; F04D 29/542; F04D 29/5806; F04D 29/703; F04D 29/20; F04D 29/263; F04D 29/266; F04D 29/545; F04D 29/547
USPC ...................................... 416/247 R
See application file for complete search history.

(56) References Cited

U.S. PATENT DOCUMENTS

| | | | | |
|---|---|---|---|---|
| 1,932,231 | A * | 10/1933 | Schmidt ................ | F04D 19/002 |
| | | | | 417/369 |
| 2,427,032 | A * | 9/1947 | Troller .................. | F04D 19/002 |
| | | | | 417/371 |

(Continued)

FOREIGN PATENT DOCUMENTS

| | | |
|---|---|---|
| CN | 203738747 U | 7/2014 |
| CN | 205134254 U | 4/2016 |

(Continued)

OTHER PUBLICATIONS

Canadian Office Action corresponding with Application No. 3,109,957 on May 9, 2022 (1 Page).

(Continued)

*Primary Examiner* — Devon C Kramer
*Assistant Examiner* — Joseph S. Herrmann
(74) *Attorney, Agent, or Firm* — Dority & Manning, P.A.

(57) ABSTRACT

A blower, comprises a blower body, accommodating therein a fan and an electric motor driving the fan to rotate. A rotation shaft of the fan defines a longitudinal axis. A blow pipe is removably attached to the blower body. A tapered member is provided between the electric motor and an air inlet of the blower body, the tapered member gradually narrowing toward the air inlet.

23 Claims, 7 Drawing Sheets

(51) Int. Cl.
*F04D 19/00* (2006.01)
*F04D 29/58* (2006.01)
*F04D 29/66* (2006.01)

(56) References Cited

U.S. PATENT DOCUMENTS

| | | | | |
|---|---|---|---|---|
| 2,494,772 | A * | 1/1950 | McElroy | F04D 29/5806 |
| | | | | D23/413 |
| 2,867,377 | A * | 1/1959 | Lasko | F04D 29/646 |
| | | | | 417/326 |
| 2,900,202 | A * | 8/1959 | Thompson | F04D 29/668 |
| | | | | 403/199 |
| 2,969,559 | A | 1/1961 | Landis | |
| 4,132,507 | A | 1/1979 | Akiyama | |
| 4,692,091 | A * | 9/1987 | Ritenour | F04D 29/526 |
| | | | | 415/209.1 |
| 5,215,433 | A * | 6/1993 | Weiland | F04D 29/685 |
| | | | | 415/914 |
| 5,839,205 | A | 11/1998 | Hung | |
| 6,003,199 | A | 12/1999 | Shaffer | |
| 6,105,206 | A | 8/2000 | Tokumaru | |
| 8,512,035 | B2 * | 8/2013 | Super | F23D 14/70 |
| | | | | 431/177 |
| 10,094,394 | B2 * | 10/2018 | Heli | F04D 29/644 |
| 10,107,292 | B2 | 10/2018 | Schäffler | |
| 10,165,738 | B2 | 1/2019 | Haramoto | |
| 10,337,526 | B2 * | 7/2019 | Shao | F04D 29/703 |
| 2008/0219836 | A1 * | 9/2008 | Decker | F04D 29/542 |
| | | | | 29/889.3 |
| 2011/0052434 | A1 * | 3/2011 | Chang | F04D 29/5806 |
| | | | | 417/423.8 |
| 2016/0029863 | A1 * | 2/2016 | Guo | A47L 9/08 |
| | | | | 15/415.1 |
| 2016/0230813 | A1 * | 8/2016 | Griffiths | F04C 2/084 |
| 2017/0260985 | A1 | 9/2017 | Gao | |
| 2017/0273251 | A1 | 9/2017 | Haramoto | |
| 2017/0325410 | A1 | 11/2017 | Gao | |
| 2018/0228326 | A1 | 8/2018 | Crichton | |
| 2019/0211830 | A1 | 7/2019 | Liu | |
| 2019/0353171 | A1 | 11/2019 | Hoffman | |

FOREIGN PATENT DOCUMENTS

| | | | |
|---|---|---|---|
| CN | 205277853 | * | 6/2016 |
| CN | 205277853 U | | 6/2016 |
| CN | 106812099 A | | 6/2017 |
| CN | 106854860 A | | 6/2017 |
| CN | 109423972 | * | 3/2019 |
| CN | 109423972 A | | 3/2019 |
| CN | 111188797 A | * | 5/2020 |
| DE | 112009000859 A5 | | 6/2011 |
| DE | 202013012745 U1 | * | 3/2019 |

OTHER PUBLICATIONS

European Official Communication Corresponding with Application No. 21159440.3 on Feb. 16, 2023 (1 page).
European Search Report for EP Patent Application No. EP21159440 dated Jun. 22, 2021; 2 pages.

* cited by examiner

BLOWER

This application claims the benefit of priority to Chinese Patent Application No. 2020202099224, filed on Feb. 26, 2020, the disclosure of which is incorporated by reference herein in its entirety.

TECHNICAL FIELD

The present application relates to a blower, in particular to a blower for gardening work.

BACKGROUND

Leaf blowers are mainly used for blowing away fallen leaves, road surface dust, accumulated water and accumulated snow, etc. Common types of blower include centrifugal blowers and axial-flow blowers. Centrifugal blowers generally comprise a housing and, installed in the housing, an electric motor and a centrifugal fan. The housing has an air inlet, an air outlet and a channel connecting the air inlet and the air outlet, with the centrifugal fan being located in the passage. Under the driving of the electric motor, the centrifugal fan generates a high-pressure airflow, which exits through the air outlet in order to perform blowing. The electric motor used in the centrifugal blower has a large volume, and consequently the blower has a high overall weight.

Axial-flow blowers generally comprise a housing and, installed in the housing, an electric motor and an axial-flow fan. The electric motor drives the axial-flow fan to rotate, pushing air entering the blower to move in the axial direction of the blower, such that the air is expelled from an extremity of a blow pipe. Compared with the centrifugal blower, the axial-flow blower is lighter in weight and has better heat dissipation performance, because the airflow flows through the electric motor in the process of passing through the blower, and can have the effect of cooling the electric motor.

However, a shortcoming which the centrifugal blower and the axial-flow blower both have is that they generate a lot of noise when in use. Since blowers generally need to be held in the hand of the user, the distance between the source of noise and the user is very short: in the case of staff who frequently operate blowers, working for long periods of time in a high-noise environment easily causes discomfort, and in serious cases might affect the hearing.

SUMMARY

The aim of the present application is to provide a blower that is capable of reducing noise generated when in use and increasing blowing efficiency.

To achieve the above objective, the present application provides a blower, comprising: a blower body, having accommodated therein a fan and an electric motor driving the fan to rotate, a rotation shaft of the fan defining a longitudinal axis: a blow pipe, removably attached to the blower body: a tapered member is provided between the electric motor and an air inlet of the blower body, the tapered member gradually narrowing toward the air inlet.

In a preferred embodiment, the blower body has a protective cover, the air inlet being defined by the protective cover, and a near end of the tapered member being connected to the protective cover. An umbrella-like protrusion is formed on the near end of the tapered member, and an annular receiving part is formed on a central part of the protective cover, the annular receiving part consisting of multiple circumferentially spaced fan-shaped parts, and the umbrella-like protrusion being snap-fitted to the fan-shaped parts. Optionally, at least one opening is formed in a peripheral wall of the tapered member, for the purpose of leading a portion of an airflow into the interior of the tapered member.

In a preferred embodiment, a groove is formed on a peripheral wall of the tapered member, the groove allowing a cable to pass through. The groove may be defined by a protruding part extending outward from the peripheral wall of the tapered member.

In a preferred embodiment, the blower body comprises an air-intake-side casing and an air-output-side casing, the air-intake-side casing comprising an electric motor support, and a far end of the tapered member being connected to the electric motor support. The electric motor support has an upstream-side opening and a downstream-side opening, which are in communication with a first opening and a second opening in an electric motor casing respectively. The upstream-side opening comprises at least one notch formed in a near-end outer wall of the electric motor support, preferably multiple notches separated by finger-like parts.

In a preferred embodiment, a far end of the electric motor support comprises an inner ring, an outer ring, and fastener mounting holes located between the inner ring and the outer ring, the downstream-side opening being formed between the inner ring and the outer ring and being located between adjacent fastener mounting holes. The electric motor support is securely connected to an inner wall of the air-intake-side casing by means of a support member, a near-end edge of the support member being inclined relative to the longitudinal axis: a junction of the near-end edge and the electric motor support is located at a far side of a vertical plane passing through the center of each notch, and a junction of the near-end edge and the inner wall of the air-intake-side casing is located at a near side of the vertical plane.

In a preferred embodiment, a near end of the air-intake-side casing opens radially outward, and the ratio d4/d5 of a minimum distance d4 to a maximum distance d5 in a vertical direction between an inner wall of the air-intake-side casing and an outer wall of the tapered member is 0.5-0.7. The ratio d6/d7 of a maximum outer diameter d6 of the tapered member to a minimum inner diameter d7 of the air-intake-side casing is 0.5-0.8.

In a preferred embodiment, the air-output-side casing comprises a tapered flow-guiding body that narrows gradually toward a far side. The ratio d4/d10 of a minimum distance d4 in a vertical direction between an inner wall of the air-intake-side casing and an outer wall of the tapered member to a minimum distance d10 in the vertical direction between an inner wall of the air-output-side casing and an outer wall of the tapered flow-guiding body is 0.7-0.95.

In a preferred embodiment, the air-output-side casing further comprises an air output grille arranged at a far end of the air-output-side casing: an extremity of the tapered flow-guiding body enters the air output grille but does not extend out of a far-end face of the air output grille. The air output grille comprises at least two concentric rings, with adjacent concentric rings being connected to each other by means of radially extending support ribs. For two radially adjacent concentric rings, the ratio of the axial width of the concentric ring located at the inside in a radial direction to the axial width of the concentric ring located at the outside in a radial direction is 0.5-0.8.

In a preferred embodiment, the fan is located in the air-intake-side casing, and is located downstream of the electric motor. The fan is connected to an output shaft of the electric motor by means of a connection member, the connection member comprising a central hole and multiple arc-shaped protruding parts that protrude from a periphery; the central hole receives the output shaft, and the arc-shaped protruding parts are inserted into arc-shaped slots formed in a central hub of the fan. The ratio d8/d9 of a longitudinal distance d8 between the electric motor support and the fan to a longitudinal length d9 of the electric motor support is 0.1-0.3.

In a preferred embodiment, at least a part of the air-intake-side casing and at least a part of the air-output-side casing are exposed to the environment.

In a preferred embodiment, the blower body further comprises a handle and a battery pack installation mechanism, the battery pack installation mechanism being positioned between the air-intake-side casing and a gripping part of the handle.

DETAILED DESCRIPTION

Figure 1:
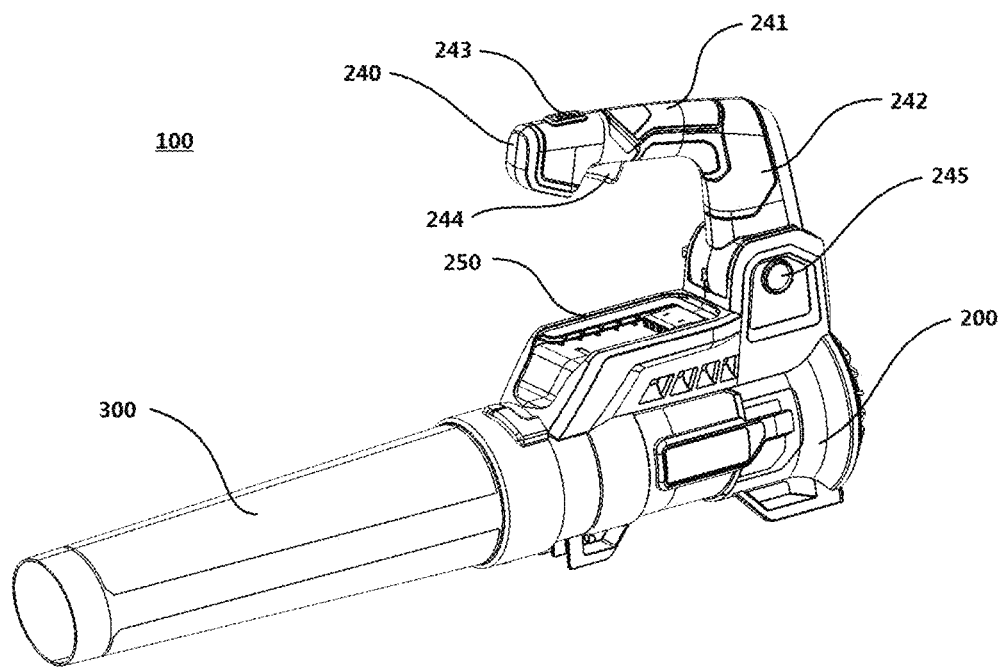
FIG. 1 shows a blower according to an embodiment of the present application.

FIG. 1 shows a blower 100 according to an embodiment of the present application; the blower is an axial-flow blower, and comprises a blower body 200 and a blow pipe 300 mounted on the blower body 200. A fan, and an electric motor driving the fan to rotate, are accommodated in the blower body 200. In a state of not being used, a user can remove the blow pipe 300 from the blower body 200 to reduce storage space.

To facilitate description, in this text, a straight line on which a rotation shaft of the fan in the blower 100 lies is defined as a longitudinal axis, a side facing toward an air outlet of the blow pipe 300 is called a far side or downstream side, and a side facing toward an air inlet of the blower body 200 is called a near side or upstream side.

Figure 2:
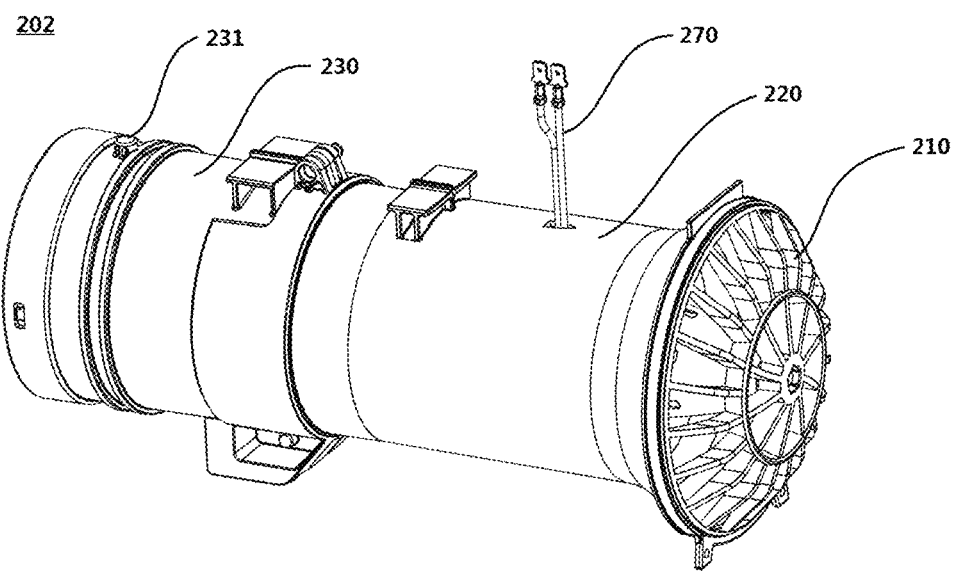
FIG. 2 shows an airflow generation assembly in the blower body.

FIG. 2 shows an airflow generation assembly 202 in the blower body 200; the airflow generation assembly defines an air flow path in the blower body 200. From the near side to the far side, the airflow generation assembly 202 sequentially comprises a protective cover 210, an air-intake-side casing 220 and an air-output-side casing 230. In this embodiment, a dismantlable connection between the blower body 200 and the blow pipe 300 is achieved by means of mating between an L-shaped locking member 310 on the blow pipe 300 and a locking protrusion 231 on the air-output-side casing 230.

Figure 3A:
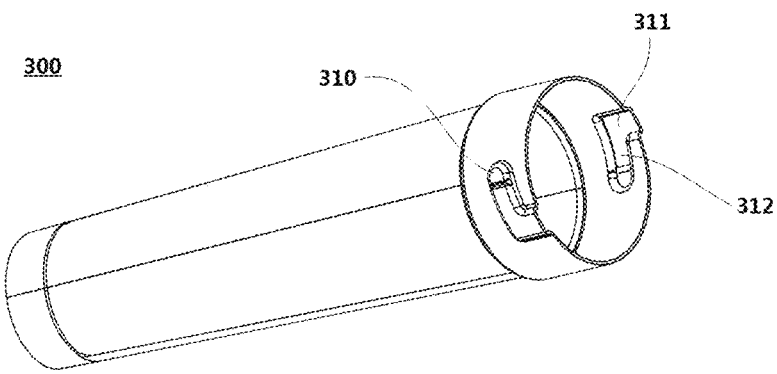
FIGS. 3A-3B show the blow pipe of the blower.

FIG. 3A shows the blow pipe 300, with the L-shaped locking member 310 being arranged on a near end thereof: the L-shaped locking member 310 defines an axially extending slot 311 and a circumferentially extending slot 312. When performing assembly, the blow pipe 300 is fitted over the air-output-side casing 230, aligning the locking protrusion 231 with the axially extending slot 311 of the L-shaped locking member. The locking protrusion 231 is then pushed into the axially extending slot 311 until the locking protrusion 231 reaches an extremity of the axially extending slot 311. Finally, the blow pipe 300 is rotated relative to the air-output-side casing 230, such that the locking protrusion 231 enters the circumferentially extending slot 312 of the L-shaped locking member, thereby achieving locking. Two or more L-shaped locking members 310 spaced apart in the circumferential direction may be provided on the blow pipe 300: at the same time, a corresponding number of locking protrusions 231 are formed in corresponding positions on the air-output-side casing 230. Although this embodiment uses an L-shaped locking member, other forms of dismantlable connection are also feasible, e.g. a snap-fit connection.

Figure 3B:
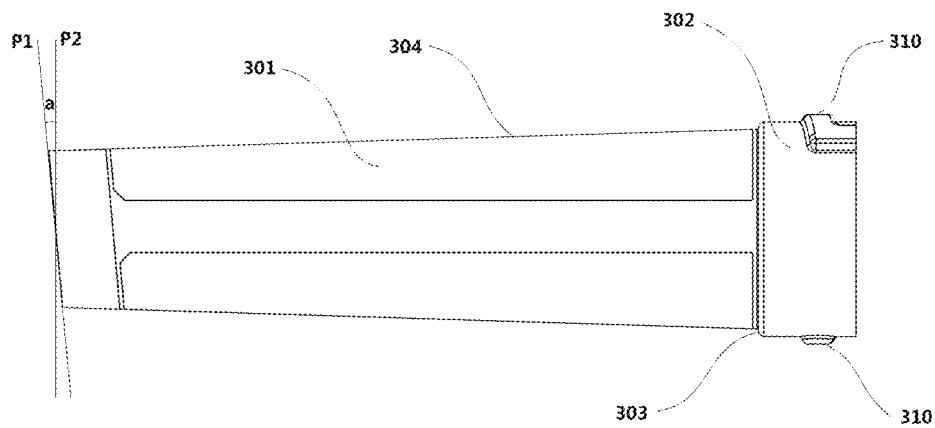

FIG. 3B is a side view of the blow pipe 300. The blow pipe 300 may be divided along the longitudinal axis into a far-side part 301 and a near-side part 302, with a step 303 being formed at the boundary of the two parts. When assembly is complete, the step 303 of the blow pipe 300 abuts a far-end edge of the air-output-side casing 230. In an embodiment that is not shown, no step is present between the far-side part and near-side part of the blow pipe 300: the blow pipe 300 extends smoothly in the longitudinal axial direction.

Viewed from one side, a plane P1 in which a far-end edge of the far-side part 301 of the blow pipe lies is inclined by an angle a relative to a vertical plane P2 perpendicular to the longitudinal axis, so that an upper side of the blow pipe 300 extends a greater distance relative to a lower side. The angle a is preferably less than 30 degrees, more preferably less than 25 degrees, and especially preferably less than 15 degrees. In general, when the user is holding the blower by hand to perform a job, the angle a readily concentrates the force of the airflow into a target region. Similarly viewed from one side, a straight line on which an outer surface 304 of the blow pipe lies is at an angle relative to the longitudinal axis; this is referred to as the taper angle of the blow pipe, and is preferably less than 10 degrees, more preferably less than 5 degrees, and especially preferably less than 2 degrees. Too large a taper angle results in a significant decrease in the area of an air delivery port, and this will increase the force of the airflow at the air delivery port excessively, possibly blowing up heavy objects undesirably, and will also exert high pressure on a blow pipe inner wall close to the air delivery port. Optionally, a bottom support member is provided at the near-side part 302 of the blow pipe 300, allowing the blower to be placed stably on the ground, and preventing wear to a blow pipe outer surface.

Figure 4:
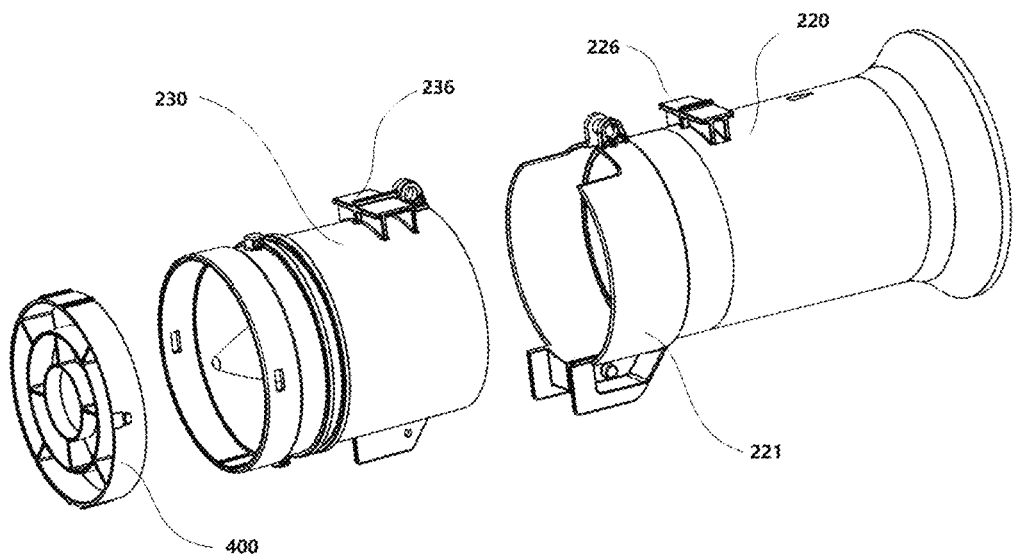
FIG. 4 shows the components that form the airflow generation assembly.

The airflow generation assembly 202 is described below in conjunction with FIGS. 4-12. FIG. 4 is an exploded drawing of the airflow generation assembly 202, showing the air-intake-side casing 220, the air-output-side casing 230 and an air output grille 400. In this embodiment, a near-end diameter of the air-output-side casing 230 is slightly less than a far-end diameter of the air-intake-side casing 220, such that a near end of the air-output-side casing 230 can be inserted into a far end 221 of the air-intake-side casing 220.

Figure 5A:
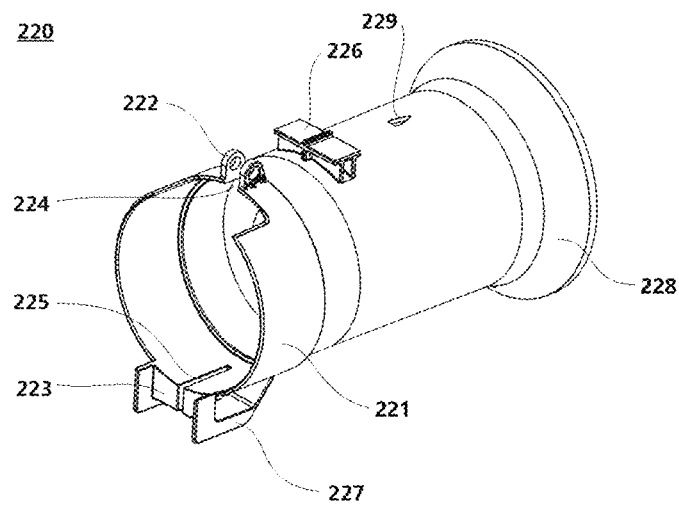
FIGS. 5A-5C show the air-intake-side casing in the airflow generation assembly.
Figure 6:
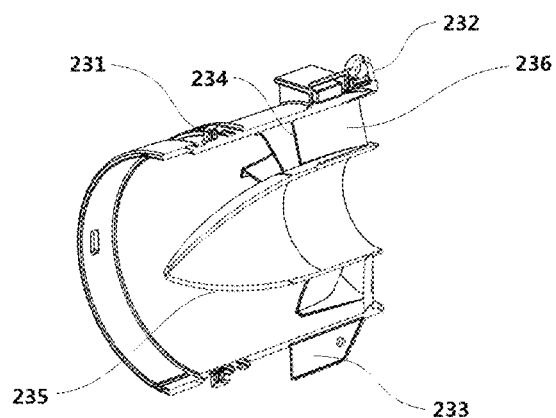
FIG. 6 shows the air-output-side casing in the airflow generation assembly.

FIG. 5A shows the air-intake-side casing 220, with two pairs of fastener supports 222, 223 being formed on an outer wall of the far end 221 thereof: a gap 224 is present between a first pair of fastener supports 222, and a gap 225 is present between a second pair of fastener supports 223. FIG. 6 shows the air-output-side casing 230, with fastener supports 232, 233 being formed on an outer wall of the near end thereof. Once the air-output-side casing 230 has been inserted into the air-intake-side casing 220, the fastener supports 232, 233 on the air-output-side casing 230 enter the gaps 224, 225 respectively, and fasteners (e.g. screws or pins) are passed through the aligned fastener supports 222, 232 and 223, 233 to securely connect the two casings 220, 230. Such a manner of installation prevents the airflow from flowing out of an airflow passage through a gap at the junction of the air-intake-side casing 220 and air-output-side casing 230. Preferably, a positioning member 226, 236 is provided on an outer wall of the air-intake-side casing 220 and/or the air-output-side casing 230: the positioning member is matched to a corresponding feature in a body housing, to ensure that the casings 220, 230 are installed at predetermined positions in the blower body 200. In addition, the air-output-side casing 230 and/or air-intake-side casing 220 may have a bottom support member 227: when the blower is placed on the ground, the bottom support member 227 prevents the casing outer wall from coming into contact with the ground. A near end 228 of the air-intake-side casing 220 is opened radially outward, substantially in a trumpet shape. The protective cover 210 is removably connected to the near end 228 of the air-intake-side casing 220.

Preferably, at least a part of the air-intake-side casing 220 and at least a part of the air-output-side casing 230 are exposed to the environment. As shown in FIG. 1, in this embodiment, the body housing of the blower body 200 only encloses a near-side part of the air-intake-side casing 220: it does not completely enclose the casings 220, 230. This design reduces the housing weight and the manufacturing cost. Furthermore, since contact between the body housing and the casings 220, 230 is reduced, even if the casings 220, 230 vibrate during operation, collisions and rubbing between the body housing and the casings 220, 230 are limited, thus reducing noise when the blower is running.

Figure 5B:
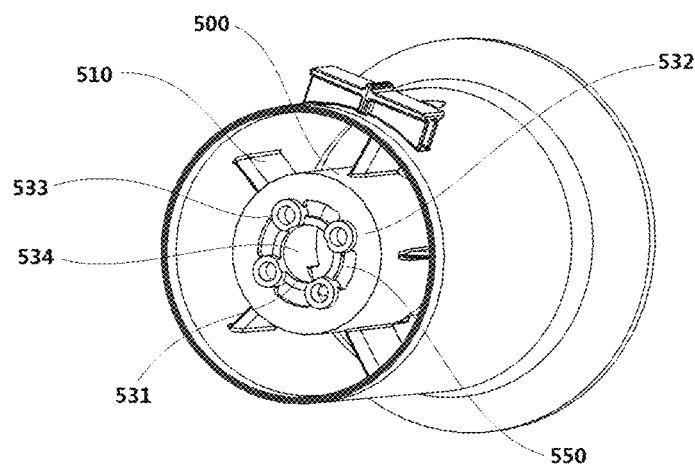
Figure 5C:
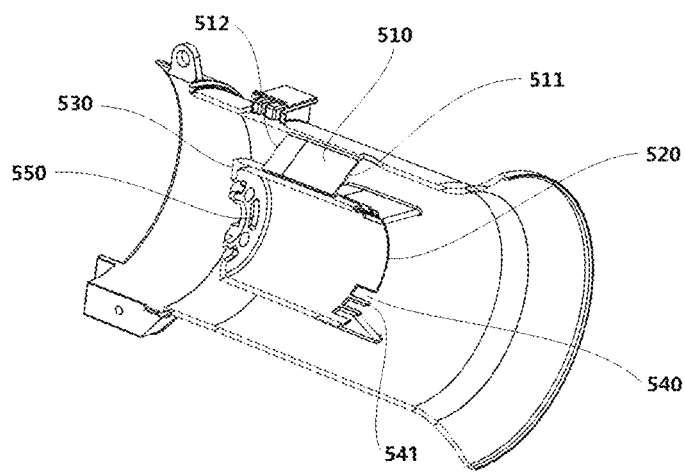

FIGS. 5B and 5C show the internal structure of the air-intake-side casing 220, comprising an electric motor support 500, in which the electric motor is accommodated. The electric motor support 500 is securely connected to an inner wall of the air-intake-side casing 220 by means of multiple support members 510. In this embodiment, the support member 510 is constructed in the form of a blade, with the thickness of a near-end edge 511 thereof being greater than the thickness of a far-end edge 512. A near end 520 of the electric motor support 500 is open, for the purpose of receiving the electric motor. A far end 530 of the electric motor support 500 comprises an inner ring 531, an outer ring 532, and fastener mounting holes 533 located between the inner ring and the outer ring. An output shaft 810 of an electric motor 800 (shown in FIG. 12) extends through a central hole 534 defined by the inner ring 531. Fasteners (e.g. screws) pass through the fastener mounting holes 533 to secure the electric motor 800 to the electric motor support 500.

Openings allowing the airflow to pass through the electric motor support are provided at a downstream side and an upstream side of the electric motor support 500. In this embodiment, an upstream-side opening of the electric motor support 500 is formed as a notch 540 in a near-end outer wall of the support: the notch 540 is aligned with a first opening 801 in an electric motor casing (shown in FIG. 12). Preferably, adjacent notches 540 are separated by finger-like parts 541. A downstream-side opening 550 of the electric motor support is formed between the inner ring 531 and outer ring 532 and located between adjacent fastener mounting holes 533; the downstream-side opening 550 is aligned with a second opening 802 in the electric motor casing (shown in FIG. 12).

FIG. 6 shows the internal structure of the air-output-side casing 230. The air-output-side casing 230 comprises a tapered flow-guiding body 235 which narrows gradually toward the far side. The air-output-side casing 230 has multiple static blades 236, which extend from an outer wall of the tapered flow-guiding body 235 to an inner wall of the air-output-side casing 230. The static blades 236 are located at a near end of the air-output-side casing 230, and arranged close to the fan. Preferably, the number of static blades 236 is greater than or equal to the number of fan blades. In this embodiment, a peripheral wall of the tapered flow-guiding body 235 is closed, with no opening being provided in the peripheral wall: an accelerated airflow generated by the rotation of the fan will not flow back into the tapered flow-guiding body 235. Although the static blade 236 shown in FIG. 6 has a smooth edge 234, the static blade may also be designed to have a non-smooth edge, e.g. a corrugated or serrated edge.

Figure 7A:
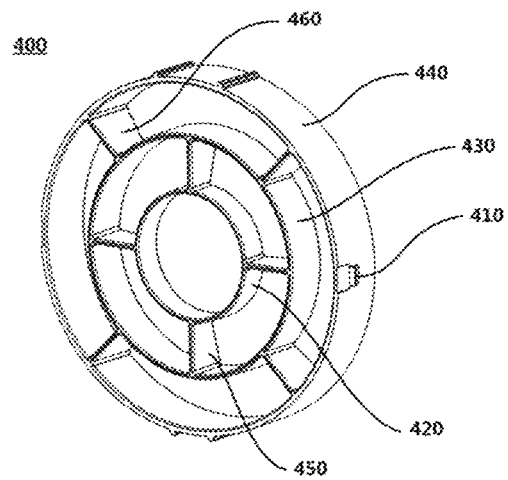
FIGS. 7A-7B show the air output grille in the air-output-side casing.

FIG. 7A shows the air output grille 400, which is arranged at a far end of the air-output-side casing 230. In this embodiment, the air output grille 400 is removably mounted on an inner wall at the far end of the air-output-side casing 230 by means of a snap-fit connection member 410. The air output grille 400 could also be attached to the air-output-side casing 230 in another way, or could be integrally formed with the air-output-side casing 230. The air output grille 400 comprises at least two concentric rings 420, 430, 440, with adjacent concentric rings being connected to each other by means of radially extending support ribs 450, 460.

Figure 7B:
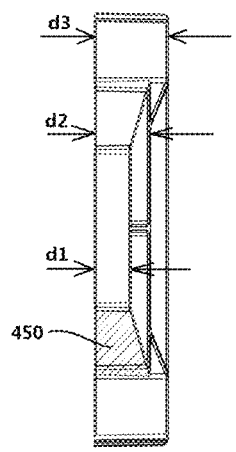

FIG. 7B shows a cross section of the air output grille 400. The three concentric rings 420, 430, 440 have axial widths d1, d2, d3 respectively. Preferably, the axial width of the concentric ring located at the inside in a radial direction is less than the axial width of the concentric ring located at the outside in a radial direction. The ratios d1/d2 and d2/d3 of the axial widths of adjacent concentric rings are preferably 0.3-0.9, more preferably 0.5-0.8, and especially preferably 0.6-0.7. The shape of the support ribs 450, 460 connecting adjacent concentric rings 420, 430, 440 may be trapezoidal. The number of concentric rings and support ribs in the air output grille may be determined according to parameters such as the power of the blower, the cross-sectional area of the airflow passage and the length of the blow pipe. The number of concentric rings and support ribs should not be too large, because a densely arranged grille will undesirably reduce the actual air output area. The air output grille 400 shown in FIGS. 7A-7B has three concentric rings, with adjacent concentric rings being connected to each other by four support ribs.

Figure 8:
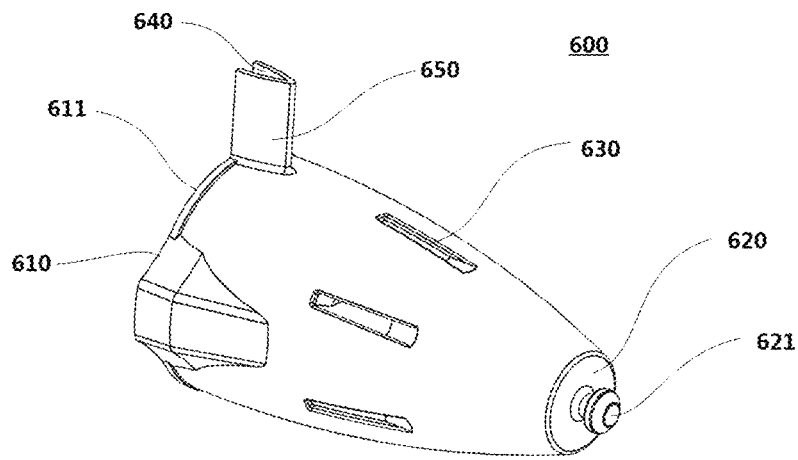
FIG. 8 shows the tapered member in the air-intake-side casing.

FIG. 8 shows a tapered member 600, which is arranged between the electric motor and an air inlet of the body housing, and narrows gradually toward the air inlet. In this embodiment, a far end 610 of the tapered member 600 is connected to the near end 520 of the electric motor support 500 of the air-intake-side casing 220, and a far-end edge 611 of the tapered member 600 closes the notch 540 formed in the near-end outer wall of the support, defining an opening allowing an airflow to enter the electric motor. Optionally, at least one opening 630 is formed in a peripheral wall of the tapered member, for the purpose of leading a portion of an incoming airflow directly into the interior of the tapered member 600. In order to reduce noise, it is also possible to remove the opening 630 in the tapered member 600, and rely on the notch 540 alone to lead the airflow into the electric motor.

A groove 640 is also formed on the peripheral wall of the tapered member 600, for the purpose of guiding a cable 270 associated with operation of the electric motor or fan (shown in FIG. 2). In this embodiment, the groove 640 is formed by a protruding part 650 that extends outward from the peripheral wall of the tapered member 600; the protruding part 650 is aligned with an opening 229 (shown in FIG. 5A) formed in the air-intake-side casing 220.

Figure 9:
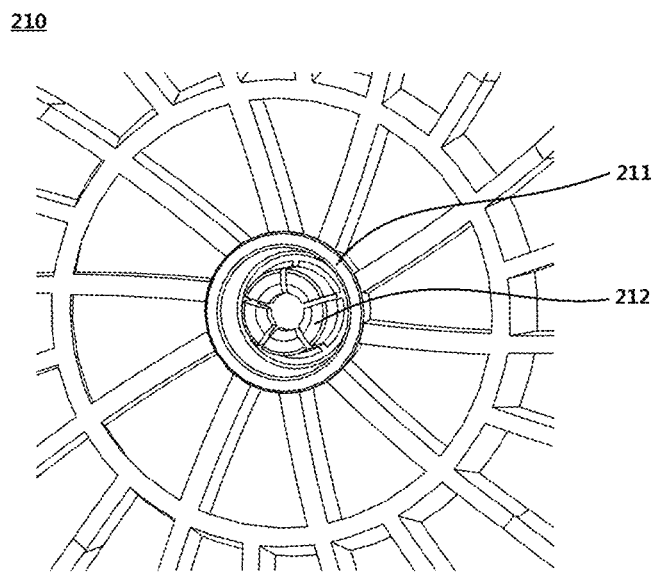
FIG. 9 shows the protective cover of the blower body.

FIG. 9 shows the protective cover 210. Based on safety considerations, and at the same time in order to prevent small objects from entering the blower body 200 with the airflow, the protective cover 210 is constructed as a grille. A near end 620 of the tapered member 600 is removably connected to the protective cover 210. A first mating part is formed on the near end 620 of the tapered member, and a second mating part is formed on a central part 211 of the protective cover 210. In this embodiment, the first mating part is an umbrella-like protrusion 621, and the second mating part is an annular receiving part consisting of multiple circumferentially spaced fan-shaped parts 212; the umbrella-like protrusion 621 is snap-fitted to the fan-shaped parts 212. It should be understood that other forms of dismantlable connection are also feasible, and are included in the scope of the present application.

Figure 10:
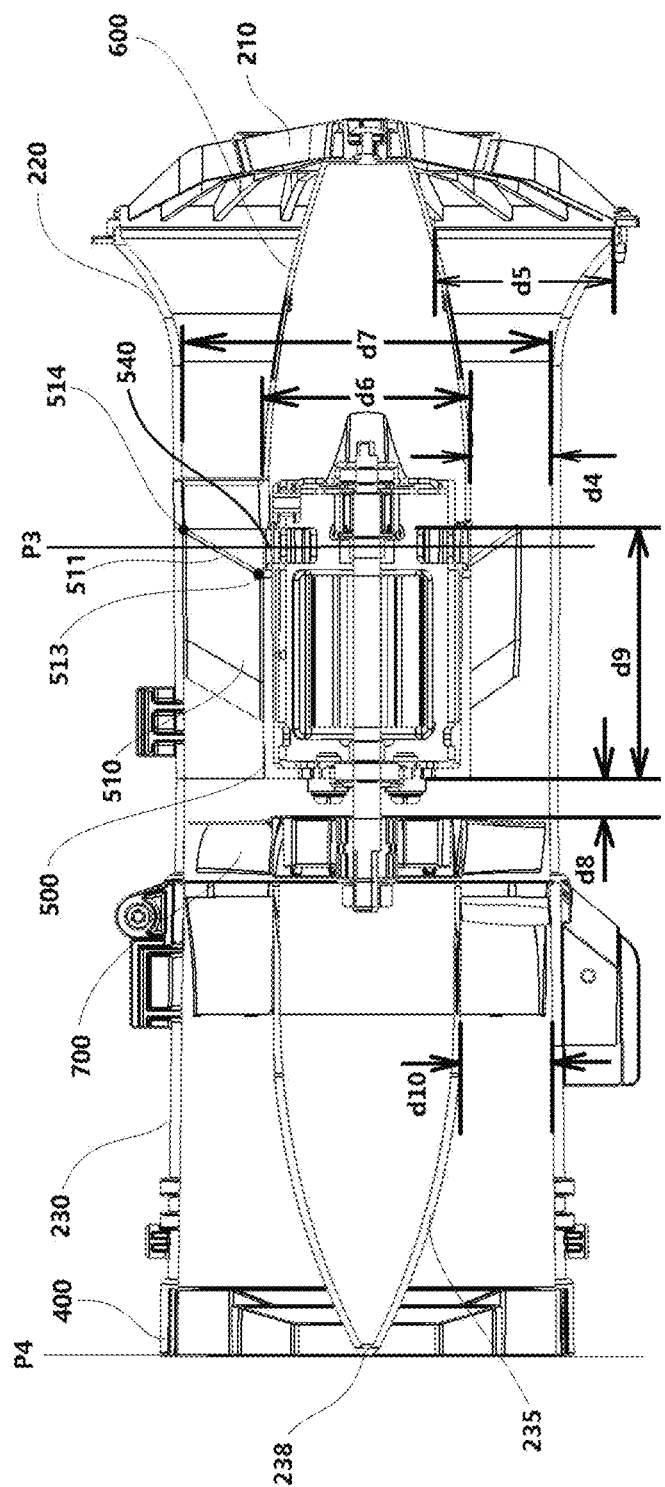
FIG. 10 shows a cross section of the airflow generation assembly.

FIG. 10 shows a cross section of the airflow generation assembly 202. The near-end edge 511 of the support member 510 of the electric motor support 500 is inclined relative to the longitudinal axis. If a vertical plane passing through the centers of all of the notches 540 is defined as a plane P3, then a junction 513 of the near-end edge 511 and the electric motor support 500 is located at the far side of the plane P3, and a junction 514 of the near-end edge 511 and the inner wall of the air-intake-side casing 220 is located at the near side of the plane P3.

Since the tapered member 600 narrows gradually toward an air inlet of the blower, it occupies a small cross section in a region close to the air inlet, and thus will not significantly reduce the air intake area. At the same time, in the present application, the near end 228 of the air-intake-side casing 220 is designed to open outward radially, and this increases the air intake area. Since the tapered member 600 gradually expands toward the far side and the air-intake-side casing 220 narrows toward the far side, the cross-sectional area of an annular airflow passage located between the two parts decreases in the airflow direction, and the flow speed of the airflow is thereby increased. The ratio d4/d5 of a minimum distance d4 to a maximum distance d5 in the vertical direction between the inner wall of the air-intake-side casing and an outer wall of the tapered member is preferably 0.3-0.8, more preferably 0.5-0.7, and especially preferably 0.55-0.65. The ratio d6/d7 of a maximum outer diameter d6 of the tapered member 600 to a minimum inner diameter d7 of the air-intake-side casing 220 is preferably 0.4-0.9, more preferably 0.5-0.8, and especially preferably 0.6-0.7. The tapered member 600 is arranged at the air inlet, and is connected to the protective cover 210, thus, the cross section of the airflow passage starts to gradually change from the air inlet, and will not suddenly decrease due to the electric motor appearing in the airflow passage. This helps to form a steady airflow in the blower body 200, increasing the blower efficiency.

The tapered flow-guiding body 235 extends from an upstream end of the air-output-side casing 230 to a downstream end. In this embodiment, the tapered flow-guiding body 235 extends into the air output grille 400, but does not extend out of a far-end face of the air output grille 400. Preferably, an extremity 238 of the tapered flow-guiding body and the far-end face of the air output grille 400 are located in the same vertical plane P4. The concentric rings of the air output grille 400 divide an air outlet of the blower body 200 into multiple annular regions, such that a high-speed airflow guided by the tapered flow-guiding body 235 flows into the blow pipe 300 smoothly.

Figure 11:
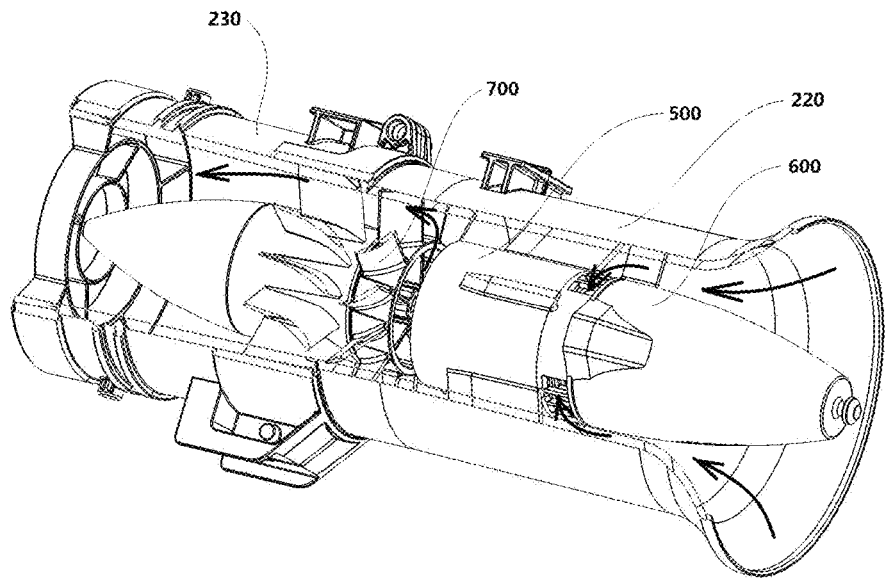
FIG. 11 shows a cooling airflow that dissipates heat from the electric motor.

In FIG. 11, arrows are used to show a cooling airflow that dissipates heat from the electric motor. Air entering through the protective cover 210 passes through the annular airflow passage between the air-intake-side casing 220 and the tapered member 600. A main airflow flows forward along the airflow passage and enters the air-output-side casing 230; a portion of air enters the electric motor via the upstream-side opening of the electric motor support 500 and the first opening in the electric motor casing, carries away heat generated during electric motor operation, and then leaves the electric motor via the second opening in the electric motor casing and the downstream-side opening of the electric motor support 500. The cooling airflow flows radially outward through a space between the electric motor support 500 and a fan 700, and then enters the air-output-side casing 230 with the main airflow.

FIG. 10 shows a longitudinal distance d8 between the electric motor support 500 and the fan 700, and a longitudinal length d9 of the electric motor support 500: the ratio d8/d9 between the two is preferably 0.05-0.5, more preferably 0.1-0.3, and especially preferably 0.1-0.2. This ratio can ensure that the cooling airflow will not build up in the electric motor, and will not affect the progress of the main airflow. The ratio d4/d10 of a minimum distance d4 in the vertical direction between the inner wall of the air-intake-side casing 220 and the outer wall of the tapered member 600 to a minimum distance d10 in the vertical direction between an inner wall of the air-output-side casing 230 and the outer wall of the tapered flow-guiding body 235 is preferably 0.7-0.95, more preferably 0.8-0.95, and especially preferably 0.85-0.9. This ratio can avoid undesired obstruction of the airflow when entering the air-output-side casing 230 from the air-intake-side casing 220.

Figure 12:
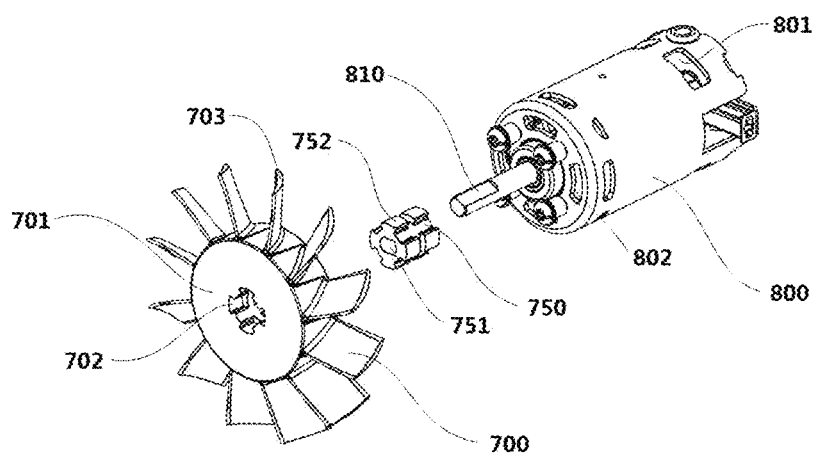
FIG. 12 shows the electric motor and fan in the blower body.

FIG. 12 shows the fan 700 and the electric motor 800, both being located in the air-intake-side casing 220, wherein the electric motor 800 is installed in the electric motor support 500. The first opening 801 and second opening 802 are formed at two sides of the electric motor casing respectively, as an inlet and outlet for the cooling airflow. The fan 700 is connected to an output shaft 810 of the electric motor 800 by means of a connection member 750. In this embodiment, the connection member 750 comprises a central hole 751 and multiple arc-shaped protruding parts 752 that protrude from a periphery. The central hole 751 is configured to receive the output shaft 810; the arc-shaped protruding parts 752 are inserted into arc-shaped slots 702 formed in a central hub 701 of the fan 700. The connection member 750 may be made of a non-elastic material, such as metal.

The electric motor 800 may be a brushless motor, and the diameter thereof is preferably 20-100 mm, more preferably 30-80 mm, and especially preferably 50-60 mm. The outer diameter of the fan is preferably 80-150 mm, more preferably 90-120 mm, and especially preferably 100-110 mm. A gap between a fan blade extremity 703 and the inner wall of the air-intake-side casing 220 is preferably 0.5-2.5 mm, and more preferably 0.8-1.5 mm. Too small a gap might result in the blade scraping the casing inner wall; too large a gap would increase noise, and reduce blowing efficiency.

Returning to FIG. 1, the blower body 200 further comprises a handle 240; the handle 240 has a gripping part 241 for a user to grip, and a connecting part 242 that connects the gripping part 241 to the body housing. Control buttons 243, 244 are provided on the gripping part 241, and the user can operate the blower with a single hand. Optionally, the connecting part 242 is connected to the body housing in such a way as to be able to rotate around a pivot 245, allowing the user to adjust the orientation of the handle 240 relative to the body housing. After completing adjustment, the user can use a locking mechanism to lock the orientation of the handle.

The blower body 200 further comprises a battery pack installation mechanism 250. As battery technology develops, the capacities of battery packs are steadily increasing, and the weights thereof are increasing accordingly; the weight of some large-capacity battery packs can reach more than 50% of the total weight of the blower. In this embodiment, the battery pack installation mechanism 250 is positioned between the air-intake-side casing 220 and the gripping part 241 of the handle 240. This arrangement helps the user to maintain the orientation of the blower stably during handheld blower operations.

Although the present application has been explained in detail only in conjunction with limited embodiments, it should be understood that the present application is not limited to these disclosed embodiments. Those skilled in the art can envisage other embodiments that conform to the spirit and scope of the present application, including changes in quantities of components, alterations, substitutions or equivalent arrangements, and all such embodiments shall fall within the scope of the present application.

The invention claimed is:

1. A blower, comprising:
a blower body, having accommodated therein a fan and an electric motor driving the fan to rotate, a rotation shaft of the fan defining a longitudinal axis, the blower body further having a protective cover, the protective cover defining an air inlet of the blower body;
a blow pipe, removably attached to the blower body,
wherein a tapered member is provided between the electric motor and the air inlet of the blower body, the tapered member narrowing toward the air inlet,
wherein a near end of the tapered member is connected to the protective cover at the longitudinal axis of the fan,
wherein the blower body comprises an air-intake-side casing and an air-output-side casing, an electric motor support is provided in the air-intake-side casing or between the air-intake-side casing and the air-output-side casing, and a far end of the tapered member is connected to the electric motor support.

2. The blower as claimed in claim 1, wherein at least one opening is formed in a peripheral wall of the tapered member, for the purpose of leading a portion of an airflow into the interior of the tapered member.

3. The blower as claimed in claim 1, wherein a groove is formed on a peripheral wall of the tapered member, the groove allowing a cable to pass through.

4. The blower as claimed in claim 3, wherein the groove is defined by a protruding part extending outward from the peripheral wall of the tapered member.

5. The blower as claimed in claim 1, wherein a protrusion is formed on the near end of the tapered member, and a receiving part is formed on a central part of the protective cover, the protrusion being snap-fitted to the receiving part.

6. The blower as claimed in claim 5, wherein the protrusion is an umbrella-like protrusion, and the receiving part is an annular receiving part consisting of multiple circumferentially spaced fan-shaped parts, and the umbrella-like protrusion is snap-fitted to the fan-shaped parts.

7. The blower as claimed in claim 1, wherein at least a part of the air-intake-side casing and at least a part of the air-output-side casing are exposed to the environment.

8. The blower as claimed in claim 1, wherein the blower body further comprises a handle and a battery pack installation mechanism, wherein the battery pack installation mechanism is located between the air-intake-side casing and a gripping portion of the handle.

9. The blower as claimed in claim 1, wherein the fan is located inside the air-intake-side casing, and downstream of the electric motor.

10. The blower as claimed in claim 9, wherein the fan is connected to an output shaft of the electric motor by means of a connection member, the connection member comprising a central hole and multiple arc-shaped protruding parts that protrude from a periphery of the connection member; the central hole receives the output shaft, and the arc-shaped protruding parts are inserted into arc-shaped slots formed in a central hub of the fan.

11. The blower as claimed in claim 9, wherein a ratio d8/d9 of a longitudinal distance d8 between the electric motor support and the fan to a longitudinal length d9 of the electric motor support is 0.1-0.3.

12. The blower as claimed in claim 1, wherein the electric motor support has an upstream-side opening and a downstream-side opening, each in communication with a first opening or a second opening of a motor casing respectively.

13. The blower as claimed in claim 12, wherein a far end of the electric motor support comprises an inner ring, an outer ring, and fastener mounting holes located between the inner ring and the outer ring, the downstream-side opening being formed between the inner ring and the outer ring and being located between adjacent fastener mounting holes.

14. The blower as claimed in claim 12, wherein the upstream-side opening comprising at least one notch formed in a near-end outer wall of the electric motor support.

15. The blower as claimed in claim 14, wherein the upstream-side opening comprises a plurality of notches, and adjacent notches are separated by finger-like parts.

16. The blower as claimed in claim 15, wherein the electric motor support is securely connected to an inner wall of the air-intake-side casing by means of a support member, a near-end edge of the support member being inclined relative to the longitudinal axis; a junction of the near-end edge and the electric motor support is located at a far side of a vertical plane passing through the center of each notch, and a junction of the near-end edge and the inner wall of the air-intake-side casing is located at a near side of the vertical plane.

17. The blower as claimed in claim 1, wherein a near end of the air-intake-side casing opens radially outward; a ratio d4/d5 of a minimum distance d4 to a maximum distance d5 in a vertical direction between an inner wall of the air-intake-side casing and an outer wall of the tapered member is 0.5-0.7.

18. The blower as claimed in claim 1, wherein a ratio d6/d7 of a maximum outer diameter d6 of the tapered member to a minimum inner diameter d7 of the air-intake-side casing is 0.5-0.8.

19. The blower as claimed in claim 1, wherein the air-output-side casing comprises a tapered flow-guiding body that narrows toward a far side.

20. The blower as claimed in claim 19, wherein a ratio d4/d10 of a minimum distance d4 in a vertical direction between an inner wall of the air-intake-side casing and an outer wall of the tapered member to a minimum distance d10 in the vertical direction between an inner wall of the air-output-side casing and an outer wall of the tapered flow-guiding body is 0.7-0.95.

21. The blower as claimed in claim 19, wherein the air-output-side casing further comprises an air output grille arranged at a far end of the air-output-side casing; an extremity of the tapered flow-guiding body enters the air output grille but does not extend out of a far-end face of the air output grille.

22. The blower as claimed in claim 21, wherein the air output grille comprises at least two concentric rings, with adjacent concentric rings being connected to each other by means of radially extending support ribs.

23. The blower as claimed in claim 22, wherein for two radially adjacent concentric rings, a ratio of an axial width of the concentric ring located at the inside in a radial direction to an axial width of the concentric ring located at the outside in the radial direction is 0.5-0.8.

* * * * *